United States Patent [19]

Sushelnitski

[11] Patent Number: 5,052,343
[45] Date of Patent: Oct. 1, 1991

[54] CATTLE WATER DRINKING ENTICE

[76] Inventor: Larry Sushelnitski, P.O. Box 187, Iron Springs, Alberta, Canada, T0K 1G0

[21] Appl. No.: 361,640

[22] Filed: Jun. 5, 1989

[51] Int. Cl.$^5$ .............................................. A01K 7/04
[52] U.S. Cl. ....................................... 119/78; 119/74
[58] Field of Search .................. 119/78, 79, 80, 5, 74, 119/72.5

[56] References Cited

U.S. PATENT DOCUMENTS

| | | | |
|---|---|---|---|
| 1,477,447 | 12/1923 | Ritchie | 119/80 |
| 2,034,968 | 3/1936 | Bartlett | 119/74 |
| 2,366,766 | 1/1945 | Brodsky | 119/74 |
| 2,614,532 | 10/1952 | Steel | 119/80 |
| 2,692,579 | 10/1954 | Overby et al. | 119/73 |
| 2,878,781 | 3/1959 | Wingfield | 119/72 |
| 2,943,601 | 7/1960 | Shank | 119/78 |
| 3,150,639 | 9/1965 | Sereda | 119/78 |
| 3,286,724 | 11/1966 | Sawyer | 119/78 |
| 3,292,579 | 12/1966 | Buchanan | 119/5 |
| 3,302,789 | 2/1967 | Holt | 119/5 |
| 3,306,263 | 2/1967 | Johnson | 119/80 |
| 3,371,652 | 3/1968 | Louks et al. | 119/78 |
| 3,757,739 | 9/1973 | Whitener | 119/5 |
| 3,948,221 | 4/1976 | Wiuniski | 119/78 |
| 4,120,265 | 10/1978 | Davis | 119/5 |
| 4,133,967 | 2/1979 | Tamborrino | 119/78 |
| 4,433,642 | 7/1984 | Roy | 119/78 |
| 4,509,460 | 4/1985 | Seltzer | 119/74 |
| 4,628,867 | 12/1986 | Brougham et al. | 119/78 |

FOREIGN PATENT DOCUMENTS 485141 7/1952 Canada .
849777 8/1970 Canada .................................. 119/34

Primary Examiner—Paul J. Hirsch
Attorney, Agent, or Firm—Michael Sand

[57] ABSTRACT

A water trough having a container with a bottom and a peripheral side wall. A pump circulates water within the container, the pump having an inlet which is disposed below the water line of the container, and an outlet which is disposed above the water line of the container. Water from the container is drawn in through the inlet and sent cascading through the outlet onto the surface of water in the container, thereby enticing large range grazing animals, such as cattle, to drink.

1 Claim, 3 Drawing Sheets

CATTLE WATER DRINKING ENTICE

The present invention relates to a device for enticing cattle to drink from water troughs.

BACKGROUND OF THE INVENTION

In order to reduce production costs most farms which raise beef cattle let them graze on large tracts of range land, which have a natural source of water. During fall and winter, cattle are brought in off the range land and are trucked to auction marts or feed lots. By the time the cattle are delivered, it is commonly 24 to 36 hours since the cattle had access to water. There is often a concern regarding the adverse effects dehydration is having upon the health of the cattle, this concern being most acute with the calves. Although the corrals have water troughs, the cattle don't know where to look for water, and have to be enticed. This is accomplished at the present time by scattering hay in the vicinity of the water trough to bring the cattle near, and having an employee of the auction mart or feed lot splash water to make the cattle aware of the location of the water. The cattle will not drink, however, while the employee is at the water trough. The employee must, therefore, repeatedly return to the water trough and repeat the splashing procedure, until he is satisfied that all cattle have been watered.

The problem is further exacerbated in severe winter weather conditions. Great care must be taken in splashing water near the water trough, in order to prevent the creation of hazardous ice conditions in the trough area. The troughs must also be checked periodically to ensure that they have not become frozen, thereby denying the cattle access to water.

SUMMARY OF THE INVENTION

What is required is a water trough for use in watering range animals which will circulate the water within the trough to prevent freezing and make a noise like running water to entice animals to drink.

According to the present invention there is provided, a water trough which is comprised of a container having a bottom and a peripheral side wall. A pump circulates water within the container, the pump having an inlet which is disposed below the water line the container, and an outlet which is disposed above the water line of the container. Water from the container is drawn in through the inlet and sent cascading through the outlet onto the surface of water in the container.

Although beneficial results may be obtained from the use of the water trough described, even more beneficial results may be obtained if the water consumed by animals drinking from the trough is automatically replenished. This is accomplished by the preferred feature of having a flow passage through the container. The flow passage has an exterior end communicating with the exterior of the container thereby permitting connection to a remote water source, and an interior end communicating with the interior of the container. Means is provided to control the flow of water connected with the interior end of the flow passage, such that the level of water in the container may be maintained at a selected level.

Although beneficial results may be obtained by using the water trough described, even more beneficial results may be obtained by taking steps to exaggerate the sound that the water makes coming out of the outlet. This is accomplished through the preferred features of attaching a spray nozzle on the outlet; and having a plurality of reducers disposed in the connecting piping between the outlet and the spray nozzle to increase the pressure of fluids exiting the spray nozzles.

Although beneficial results may be obtained by using the water trough as described, even more beneficial results may be obtained by taking measures to ensure the pump inlet does not become clogged by debris. This is accomplished by the preferred feature of having fluids flowing through the interior end of the flow passage directed at the inlet of the pump such that the inlet is washed clear of debris.

Although beneficial results may be obtained by using the water trough as described, even more beneficial results may be obtained by taking measures to ensure the working apparatus is not damaged by the animals. This is accomplished by having dividers extending between the side wall thereby dividing the container into sections. The dividers are spaced above the bottom of the container such that a flow space is provided for communication of fluids between the sections. One of the sections, in which the working apparatus is housed, is enclosed at the top by a lid. The other of the sections are open at the top such that animals have access to the fluids contained therein:

BRIEF DESCRIPTION OF THE DRAWINGS

These and other features of the invention will become more apparent from the following description in which reference is made to the appended drawings, wherein.

DETAILED DESCRIPTION OF THE INVENTION

Figure 1:
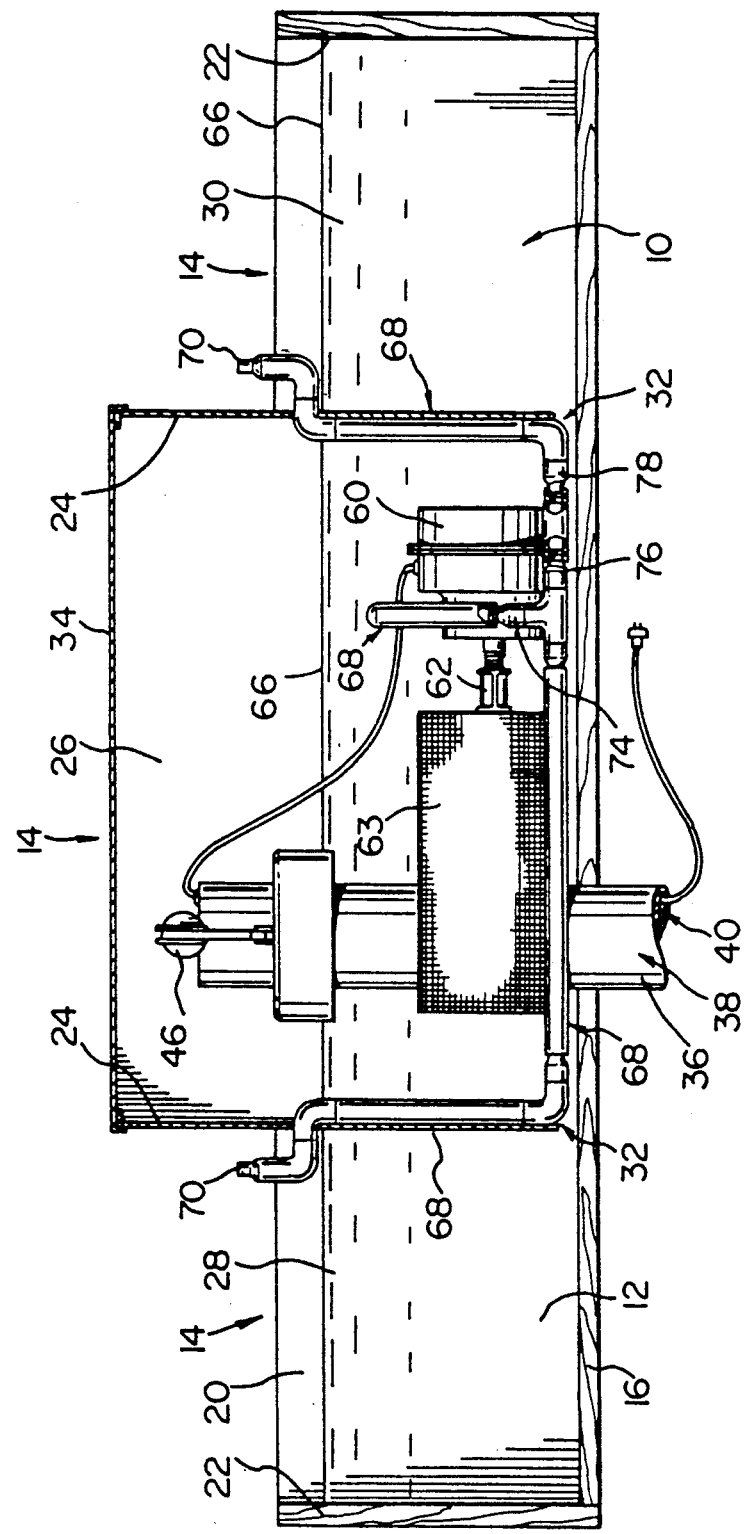
FIG. 1 is a cut-away side elevation view of a preferred embodiment of the invention.
Figure 2:
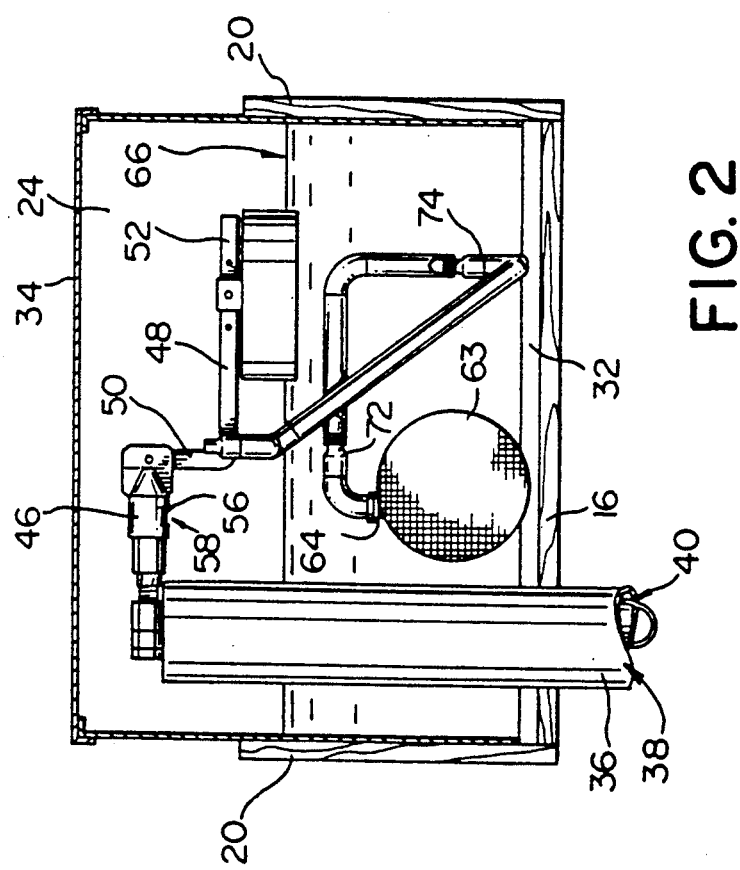
FIG. 2 is a cut-away end elevation view of a preferred embodiment of the invention.
Figure 3:
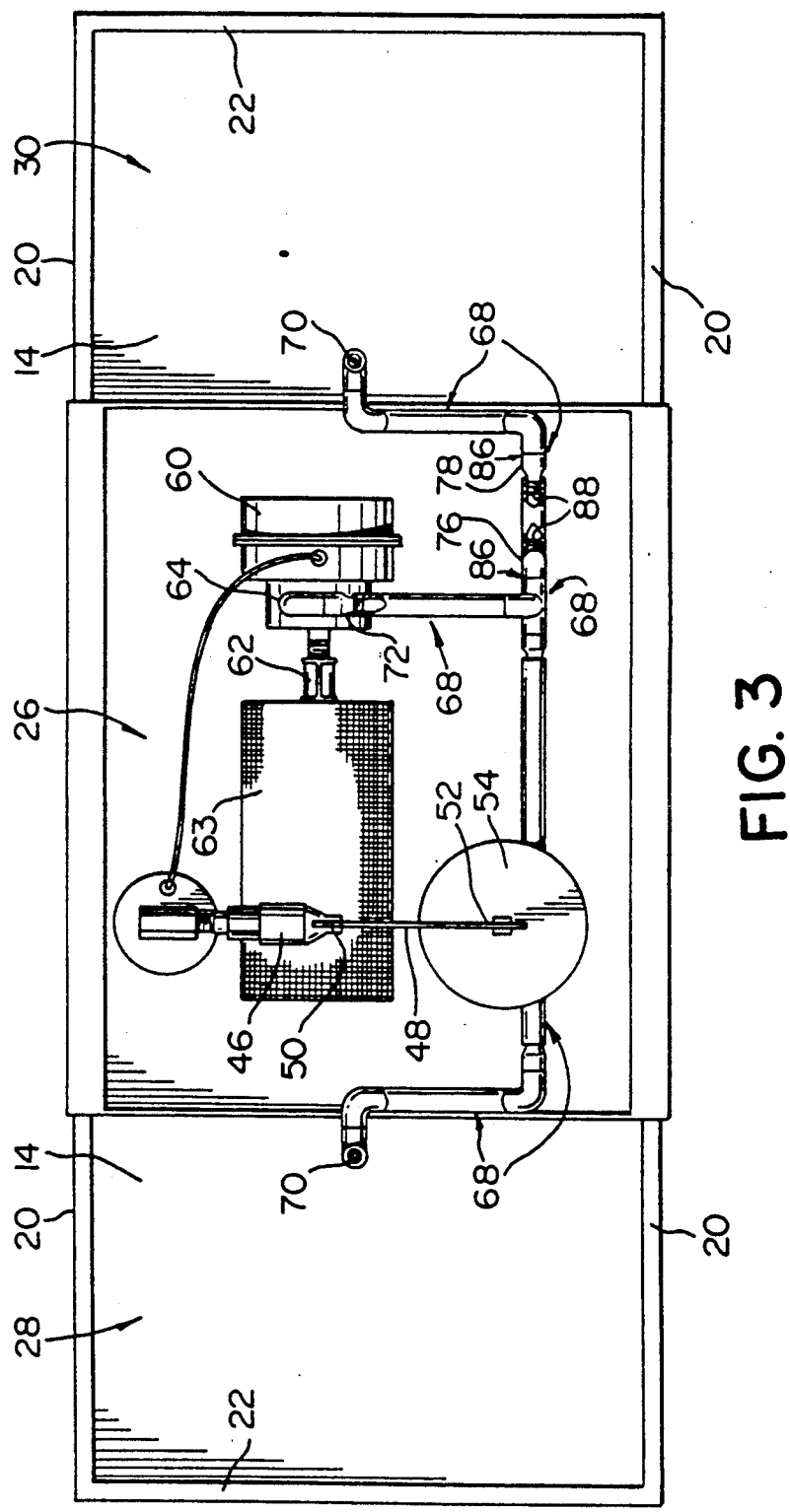
FIG. 3 is a top plan view of a portion of a preferred embodiment of the invention.

The preferred embodiment of the invention as illustrated in FIGS. 1 through 3 is a water trough, hereinafter generally referred to by reference numeral 10.

Water trough 10 has as its primary component a container 12 to contain the water from which the animals will drink. Container 12 has an open top portion 14, a bottom 16, peripheral side walls 20 and peripheral end walls 22. Two dividers 24 extend transversely between side walls 20, dividing container 12 into three sections 26, 28, and 30. Dividers 24 are spaced above bottom 16 of container 12 leaving a flow space 32 for communication of fluids between sections 26, 28 and 30. Sections 26 is enclosed at top 14 of container 12 by a lid 34. Sections 28 and 30 are open at top 14 to permit animals have access to the fluids contained therein.

Container 12 has a flow pipe 36 through bottom 16. Flow pipe 36 has an exterior end 38 and an interior end 40. Exterior end 38 protrudes from the exterior surface 42 of container 12 and is adapted to be connected to a remote water source (not shown). Interior end 40 extends into enclosed section 26 of container 12, and is connected to flow control valve 46.

Flow control valve 46 is comprised of an arm 48 having a mounting end 50 and a float end 52. Mounting end 50 is pivotally mounted in enclosed section 26 of container 12 on interior end 40 of flow pipe 36. Float end 52 is attached to a float 54 such that arm 48 moves in response to changes in the water level in enclosed section 26 of container 12. Mounting end 50 of arm 48 has a seal 56 which engages an opening 58 at interior end 40 of flow pipe 36 and restricts the flow of fluids therethrough when float 54 raises arm 48 to a preset position.

A pump 60 is adapted to circulate water within container 12. Pump 60 has an inlet 62 and an outlet 64. Inlet 62 is disposed below the water line 66 in enclosed section 26 of container 12. Inlet 62 draws fluid from section 26 of container 12, and has a mesh guard 63 to prevent debris from being drawn into pump 60. Outlet 64 is connected by piping 68 to two spray nozzles 70. One of spray nozzles 70 is disposed above water line 66 of each of open sections 28 and 30 of container 12. Piping 68 between outlet 64 of pump 60 and spray nozzles 70 has a plurality of reducers 72, 74, 76, and 78 disposed therein to increase the pressure of fluids exiting spray nozzles 70, the operation of which will be hereinafter more fully described. Each of reducers 72, 74, 76, and 78 have a wide end 86 and a narrow end 88.

The operation of water trough 10 will now be described with reference to FIGS. 1 through 3. Water trough 10 is intended to be installed between two coral enclosures with each one of open sections 28 or 30 servicing one coral enclosure. During installation exterior end 38 of flow pipe 36 is connected via underground water pipes to a remote water source (not shown). Once water is supplied from the water source to flow pipe 36, water flows through opening 58 at interior end 40 of closed section 26 of container 12. Water in closed section 26 flows through flow space 32 under dividers 24 to bring water line 66 in open sections 28 and 30 to the same level as water line 66 in section 26. As water line 66 rises float 54 rises, and consequently arm 48 is raised altering the relationship between seal 56 at mounting end 50 of arm 48 and opening 58 at interior end 40 of flow pipe 36. When arm 48 is at a preset position, seal 56 will engage opening 58 and restrict the flow of fluids therethrough. Thereafter water line 66 will be maintained at a constant level, as a lowering of water line 66 results in float 54 falling and consequently seal 56 becoming spaced from opening 58 permitting fluids to enter section 26 until the preset position of arm 48 is again reached.

When water line 66 is sufficient to permit operation, pump 60 is activated. Pump 60 draws water from section 26 through inlet 62 and through piping 68 to spray nozzles 70. Water is sent cascading through spray nozzles 70 onto the surface of water in open sections 28 and 30 of container 12. In order to get a stronger spray from pump 60, reducers 72, 74, 76, and 78 are inserted into piping 68. Following the path of water from outlet 64, water enters wide end 86 of reducer 72 and meets with resistance exiting at narrow end 88. Similarly, water meets with resistance entering narrow end 88 of reducer 74. As water exits wide end 86 of reducer 74 however the artificial resistance is removed causing water to shoot up to nozzle 70. Some water enters wide end 86 of reducer 76 and meets with resistance in exiting narrow end 88 of reducer 76. Similarly, water meets with resistance in entering narrow end 88 of reducer 78. However, as water exits wide end 86 of reducer 78, the artificial resistance is removed causing water to shoot up to the other of nozzles 70.

A delicate balance must be reached in adjusting the level of spray of spray nozzles 70. The spray must be noisy enough to attract the attention of the cattle so they know the water is there. However, the spray must not be so high as to be blown by the wind on the ground surrounding water trough 10 forming ice and creating a hazard for the cattle. Similarly, the noise level must not be such that it will frighten the cattle.

As the cattle drink from open sections 28 and 30, dividers 24 and lid 34 protect arm 48, float 54, and piping 68 from being damaged by the animals. Without the protection afforded by dividers 24 and lid 34, the maintenance requirements for the system would be prohibitive. As the cattle drink from open sections 28 and 30, an accumulation of debris unavoidably gets into the water. This debris could potentially clog inlet 62. To prevent this from happening inlet 62 is equipped with a mesh guard 63. Mesh guard 63 can itself become clogged. To reduce the likelihood of this happening fluids flowing through opening 58 at interior end 40 of flow pipe 36 are directed at mesh 63, such that mesh 63 is constantly washed clear of debris.

It is often desirable to administer medicine to the herd through the water supply. The system can readily be adapted to accommodate a medicator. One advantage of the present invention when used with medicators is that the medicine is constantly circulated throughout container 12 by the action of pump 60.

It will be apparent to one skilled in the art, the advantages the present invention provides over methods presently employed for watering cattle. It will further be apparent that the circulation of water in container 12, as described, will prevent ice from forming on the surface of the water in all but the severest of weather conditions. For convenience in servicing, it may be desirable to have pump 60 disposed external to container 12, rather than submerisible as is depicted in the FIGS. 1 through 3.

The embodiments of the invention in which an exclusive property or privilege is claimed are defined as follows:

1. A water trough, comprising:
   a. a container having a bottom and a peripheral side wall, the container having at least one section with an open top thereby permitting cattle access to the water in the container;
   b. a pump which is adapted to circulate water within said container, said pump having an inlet which is disposed below the water line of said container, and an outlet which is disposed above the water line of the open section of said container, such that water from said container is drawn in through said inlet and sprayed by said outlet into the air whereby the water is visible to the cattle, and onto the surface of water in said container whereby a sound is produced, the sight and sound of flowing water attracting the attention of the cattle thereby enticing the cattle to drink.

* * * * *